(12) United States Patent  
Zhang et al.

(10) Patent No.: US 12,407,247 B2
(45) Date of Patent: Sep. 2, 2025

(54) RESONANT ALTERNATING CURRENT/DIRECT CURRENT CONVERTER, ELECTRONIC DEVICE, AND ADAPTER

(71) Applicant: Huawei Digital Power Technologies Co., Ltd., Shenzhen (CN)

(72) Inventors: Xiao Zhang, Xi'an (CN); Luyu Wang, Shenzhen (CN); Wenbo Sun, Nuremberg (DE); Qingzu Hong, Shenzhen (CN); Grover Victor Torrico-Bascopé, Kista (SE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 241 days.

(21) Appl. No.: 18/356,425

(22) Filed: Jul. 21, 2023

(65) Prior Publication Data

US 2023/0369968 A1   Nov. 16, 2023

Related U.S. Application Data

(63) Continuation of application No. PCT/CN2021/073045, filed on Jan. 21, 2021.

(51) Int. Cl.
*H02M 3/00* (2006.01)
*H02M 1/32* (2007.01)
*H02M 7/217* (2006.01)

(52) U.S. Cl.
CPC ............. *H02M 3/01* (2021.05); *H02M 1/32* (2013.01); *H02M 7/217* (2013.01)

(58) Field of Classification Search
CPC ........... H02M 3/01; H02M 1/32; H02M 7/217
See application file for complete search history.

(56) References Cited

U.S. PATENT DOCUMENTS 5,945,783 A * 8/1999 Schultz ............. H05B 41/2827
                                                               315/219
6,051,936 A    4/2000 Qian
(Continued)

FOREIGN PATENT DOCUMENTS

CN       101340143 A     1/2009
CN       201918902 U     8/2011
(Continued)

OTHER PUBLICATIONS

Lee et al., "A Reconfigurable Totem-Pole PFC Rectifier With Light Load Optimization Control Strategy and Soft-Switching Capability", IEEE Transactions on Power Electronics, IEEE, XP011823255, ISBN: 0885-8993, Apr. 2021, vol. 36, No. 4, 12 pages.
(Continued)

*Primary Examiner* — Rafael O De Leon Domenech
(74) *Attorney, Agent, or Firm* — Maier & Maier, PLLC

(57) ABSTRACT

A resonant AC/DC converter. An input end of a half bridge rectifier circuit is connected to an alternating current power supply. A clamping surge protection circuit is connected to the half bridge rectifier circuit in parallel, and is connected to a resonant capacitor in a resonant DC/DC conversion circuit in parallel. When a voltage of the alternating current power supply is greater than a voltage of a bus capacitor, the clamping surge protection circuit is configured to prevent a surge signal entering the resonant DC/DC conversion circuit. When the voltage of the alternating current power supply is less than or equal to a voltage of a direct current bus, a voltage of the resonant capacitor is clamped. The resonant DC/DC conversion circuit performs electric energy conversion on the pulsating direct current that is output by the half bridge rectifier circuit, and then performs output.

20 Claims, 7 Drawing Sheets

(56) References Cited

U.S. PATENT DOCUMENTS

| | | | | |
|---|---|---|---|---|
| 6,316,883 | B1* | 11/2001 | Cho | H05B 41/28 |
| | | | | 315/307 |
| 9,220,159 | B2* | 12/2015 | Rooijackers | H05B 41/28 |
| 9,244,476 | B2* | 1/2016 | Ribarich | H05B 41/28 |
| 2014/0145614 | A1* | 5/2014 | Alexandrov | H05B 41/2806 |
| | | | | 315/85 |
| 2019/0393698 | A1* | 12/2019 | Joo | H02H 1/0007 |

FOREIGN PATENT DOCUMENTS

| | | | |
|---|---|---|---|
| CN | 108900100 | A | 11/2018 |
| CN | 208174563 | U | 11/2018 |
| EP | 0928061 | A1 | 7/1999 |
| EP | 1164689 | A3 | 9/2003 |
| JP | 2019169991 | A | 10/2019 |

OTHER PUBLICATIONS

Jia et al., "Characterization and Optimal Control of Totem-Pole PFC Converter With High Frequency GaN HEMTs and Low Frequency Si Diodes", IEEE Transactions on Industrial Electronics, IEEE, XP11868483, ISBN: 0278-0046, Nov. 2021, vol. 68, No. 11, 10 pages.

\* cited by examiner

RESONANT ALTERNATING CURRENT/DIRECT CURRENT CONVERTER, ELECTRONIC DEVICE, AND ADAPTER

CROSS-REFERENCE TO RELATED APPLICATIONS

This application is a continuation of International Application No. PCT/CN2021/073045, filed on Jan. 21, 2021, the disclosure of which is hereby incorporated by reference in its entirety.

TECHNICAL FIELD

The embodiments relate to the field of power supply technologies and to a resonant alternating current/direct current converter, an electronic device, and an adapter.

BACKGROUND

Currently, with popularization of intelligent ends, more users require that power adapters of the intelligent ends have high charging efficiency and small volumes, and are easy to carry.

However, a conventional power adapter generally includes at least two stages of power conversion circuits connected in series. A first-stage power conversion circuit generally includes a power factor correction (PFC,) circuit, and the PFC circuit is used to perform power factor correction on a pulsating direct current that is output by a previous-stage rectifier circuit. A second-stage power conversion circuit generally includes a direct current/direct current (DC/DC,) circuit, and the DC/DC circuit is used to convert, into a direct current that can be directly used for charging an intelligent end, a direct current that is output by the first-stage PFC circuit.

The current power adapter generally includes the two stages of power conversion circuits connected in series. Therefore, there are many power electronic devices inside the power adapter, and miniaturization of the power adapter is limited.

SUMMARY

The embodiments include a resonant alternating current/direct current converter, an electronic device, and an adapter, to reduce a quantity of power electronic devices and a volume of the resonant alternating current/direct current converter, thereby facilitating miniaturization.

An embodiment provides a resonant AC/DC converter. An input end of a half bridge rectifier circuit is configured to be connected to an alternating current power supply, to convert an alternating current of the alternating current power supply into a pulsating direct current. A clamping surge protection circuit is connected to the half bridge rectifier circuit in parallel, and the clamping surge protection circuit is connected to a resonant capacitor in a resonant DC/DC conversion circuit in parallel. The resonant capacitor is connected to a bus capacitor in parallel. The clamping surge protection circuit includes at least a unilateral conduction component. The clamping surge protection circuit clamps a voltage of the alternating current power supply when the voltage of the alternating current power supply is greater than a voltage of the bus capacitor, so that energy of the alternating current power supply is released to the bus capacitor; and clamps a voltage of the resonant capacitor when the voltage of the alternating current power supply is less than or equal to the voltage of the bus capacitor. The resonant DC/DC conversion circuit performs electric energy conversion on the pulsating direct current that is output by the half bridge rectifier circuit, and then performs output. A direct current that is output by the resonant DC/DC conversion circuit may be directly used by the electronic device. For example, when the electronic device is a mobile phone, the direct current may be directly used to charge the mobile phone.

The resonant DC/DC conversion circuit included in the resonant AC/DC converter provided in this embodiment performs electric energy conversion on the pulsating direct current that is output by the half bridge rectifier circuit, and then performs output. That is, an output voltage can be directly used to charge the electronic device, and does not need to be subjected to direct current conversion. A power conversion circuit provided in this embodiment is implemented by the resonant DC/DC conversion circuit, the resonant DC/DC conversion circuit integrates a function of a PFC circuit and a function of a DC/DC conversion circuit, and the resonant DC/DC conversion circuit includes a transformer. Therefore, signal isolation can be implemented, and there is no need to dispose an isolating circuit. The resonant DC/DC conversion circuit can implement both power factor correction and direct current conversion. Therefore, the resonant DC/DC conversion circuit integrates functions of two stages of conventional power conversion circuits. Compared with the two stages of conventional power conversion circuits, circuit density is increased, a circuit architecture is simplified, and a quantity of power electronic devices is reduced, thereby facilitating miniaturization of the resonant DC/DC conversion circuit and overall miniaturization of a power adapter. Compared with a full bridge rectifier circuit, the half bridge rectifier circuit provided in this embodiment has one less bridge arm. In other words, two diodes or two switching transistors are saved, thereby reducing the quantity of power electronic devices. In addition, compared with the full bridge rectifier circuit, during operation, the half bridge rectifier circuit reduces power consumption of conducting one diode. Therefore, electric energy conversion efficiency can be increased. The clamping surge protection circuit can implement different functions when voltage values of the alternating current power supply are different. That is, when a surge occurs in the alternating current power supply, the clamping surge protection circuit suppresses the surge, to suppress a spike pulse of the alternating current power supply, that is, to prevent a surge signal of the alternating current power supply from adversely affecting a subsequent circuit. A purpose of clamping the voltage of the resonant capacitor by the clamping surge protection circuit is to prevent the voltage of the resonant capacitor from exceeding a maximum allowable voltage, thereby protecting the resonant capacitor, and preventing the resonant capacitor from being broken down by a high voltage during operation.

The half bridge rectifier circuit provided in this embodiment may include two forms, that is, a half bridge may be implemented by a diode or may be implemented by a switching transistor, as long as the switching transistor is controlled to achieve an effect of the diode. A switching state of the switching transistor may be actively controlled. This is different from the diode. The diode is automatically conducted only when a voltage of a positive electrode of the diode is greater than a voltage of a negative electrode thereof, while the switching transistor may be conducted through control in advance. That is, a conduction angle is controllable. When the switching transistor of the rectifier circuit is actively controlled to act, the switching transistor can be conducted in advance through control without waiting until an input voltage is greater than a forward bias voltage of the diode, thereby expanding the conduction angle and making electric energy conversion more flexible. For example, if a load of the converter is a light load, the conduction angle may be smaller; and if the load of the converter is a heavy load, the conduction angle may be larger. In addition, when the switching state of the switching transistor is not actively controlled, a diode that is anti-parallel connected to the switching transistor may function as a common diode.

In a first case, the half bridge rectifier circuit includes a first diode and a second diode. A positive electrode of the first diode is connected to a negative electrode of the second diode, the negative electrode of the second diode is connected to a negative electrode of the alternating current power supply, a negative electrode of the first diode is connected to a positive electrode of a bus, and a positive electrode of the second diode is connected to a negative electrode of the bus.

In a second case, the half bridge rectifier circuit includes a first switching transistor and a second switching transistor. A first end of the first switching transistor is connected to the positive electrode of the bus, a second end of the first switching transistor is connected to a first end of the second switching transistor, and a second end of the second switching transistor is connected to the negative electrode of the bus; and a first end of the second switching transistor is connected to the negative electrode of the alternating current power supply. When the half bridge rectifier circuit is implemented by the switching transistor, the switching transistor may include an anti-parallel diode. In other words, the anti-parallel diode is disposed on each of the first switching transistor and the second switching transistor. The anti-parallel diode may be a body diode of the switching transistor or may be an additional diode. After the diode that is anti-parallel connected to the switching transistor is conducted, the switching transistor may be conducted through control. As a voltage drop of the diode exists during conduction of the diode, losses caused by the conduction of the diode are reduced, and conduction losses of the switching transistor are less than those of the diode. Therefore, electric energy conversion efficiency can be increased.

In a possible implementation, the unilateral conduction component includes a third diode and a fourth diode. A positive electrode of the third diode is connected to a positive electrode of the alternating current power supply, and a negative electrode of the third diode is connected to the positive electrode of the bus. A negative electrode of the fourth diode is connected to the positive electrode of the alternating current power supply, and a positive electrode of the fourth diode is connected to the negative electrode of the bus. The third diode may be configured to clamp a voltage of a second resonant capacitor, and the fourth diode may be configured to clamp a voltage of a first resonant capacitor.

In a possible implementation, the resonant DC/DC conversion circuit includes the first resonant capacitor, the second resonant capacitor, a first resonant inductor, and a transformer. A first end of the first resonant capacitor is connected to the positive electrode of the bus, a second end of the first resonant capacitor is connected to the positive electrode of the alternating current power supply, a first end of the second resonant capacitor is connected to the second end of the first resonant capacitor, and a second end of the second resonant capacitor is connected to the negative electrode of the bus. A first end of the first resonant inductor is connected to the second end of the first resonant capacitor, and a second end of the first resonant inductor is connected to a primary-side winding of the transformer.

In a possible implementation, the resonant DC/DC conversion circuit further includes a third switching transistor, a fourth switching transistor, a direct current blocking capacitor, and a secondary-side rectifier circuit. The secondary-side rectifier circuit is connected to a secondary-side winding of the transformer. A first end of the third switching transistor is connected to the positive electrode of the bus, and a second end of the third switching transistor is connected to the primary-side winding of the transformer by using the direct current blocking capacitor. The second end of the third switching transistor is connected to a first end of the fourth switching transistor, and a second end of the fourth switching transistor is connected to the negative electrode of the bus. The secondary-side rectifier circuit connected to the transformer in the resonant DC/DC conversion circuit in this embodiment is described by using full-wave rectification as an example. In addition, alternatively, the secondary-side rectifier circuit may be a full bridge rectifier circuit or a half bridge rectifier circuit. This is not limited in this embodiment.

In a possible implementation, the resonant DC/DC conversion circuit further includes a filter circuit. The filter circuit may filter out an interfering signal, to improve power supply quality. An input positive electrode of the filter circuit is connected to the positive electrode of the alternating current power supply, an input negative electrode of the filter circuit is connected to the negative electrode of the alternating current power supply, an output positive electrode of the filter circuit is connected to the clamping surge protection circuit, and an output negative electrode of the filter circuit is connected to the half bridge rectifier circuit.

In a possible implementation, the filter circuit includes a fifth capacitor, a sixth capacitor, a second inductor, and a third inductor. A first end of the fifth capacitor is connected to the positive electrode of the alternating current power supply, a second end of the fifth capacitor is connected to the negative electrode of the alternating current power supply, a first end of the second inductor is connected to the first end of the fifth capacitor, a second end of the second inductor is connected to a first end of the third inductor, and a second end of the third inductor is connected to the clamping surge protection circuit. A first end of the sixth capacitor is connected to the second end of the second inductor, and a second end of the sixth capacitor is connected to the half bridge rectifier circuit.

The resonant AC/DC converter provided in this embodiment can suppress a power frequency pulsed power. An operating principle is described below in detail. As the load of the converter increases, a range of a state of clamping the resonant capacitor by an input voltage in a power frequency cycle increases. As the input voltage increases, a duty cycle of an operating range of clamping by the input voltage increases, an input power increases, and an operating time of a resonance interval is relatively reduced. Therefore, an effective duty cycle of transferring energy to the secondary-side winding by the primary-side winding of the transformer decreases. That is, a gain of the resonant DC/DC conversion circuit is controlled by adjusting a frequency at a high-voltage stage, instead of transferring all energy at the high voltage stage to the secondary-side winding of the transformer, and redundant energy is stored on the bus capacitor, so that an output end generates no relatively large power frequency pulse ripple, thereby implementing an effect of suppressing a power frequency pulse. The high voltage stage herein is a stage at which an input voltage of an alternating current input end is relatively high.

In addition, the resonant AC/DC converter provided in this embodiment can implement a gain within a relatively wide range. For example, the gain may be adjusted by adjusting a resonance frequency of the resonant DC/DC conversion circuit, thereby ensuring that when the converter is applied to a power adapter, the power adapter can provide an output voltage within a relatively wide range, and may be applied to different intelligent ends. For example, the power adapter may be applied to a mobile phone and a tablet computer or a laptop computer. In this way, a plurality of intelligent ends can share one power adapter, thereby reducing costs for a user.

In addition, a degree of freedom of control may be increased by shifting a phase on a primary-side and a secondary-side of the transformer, for example, changing a time difference between a conduction moment of a switching transistor that is on a bridge arm and that is connected to the primary-side winding of the transformer and a conduction moment of a switching transistor that is on a bridge arm and that is connected to the secondary-side winding. A switching state of a switching transistor is determined by a corresponding driving pulse signal, and a phase of the driving pulse signal determines a conduction moment of the switching transistor. Therefore, phase shifting is performed to generate a phase difference, that is, a phase shift angle, between driving pulse signals corresponding to the switching transistors on the two bridge arms. If phases of the driving pulse signals corresponding to the switching transistors on the two bridge arms are the same, that is, the phase shift angle is 0, the switching transistors on the two bridge arms are synchronously conducted. The degree of freedom herein is a selectable quantity of controllable variables. A greater quantity of controllable variables leads to a higher degree of freedom of the circuit, and more convenience in controlling the circuit, so that a voltage of the bus of the converter can be adjusted.

Based on the resonant AC/DC converter provided in the foregoing embodiment, advantages of the resonant AC/DC converter are applicable to the following electronic device. Details are not described herein again. An embodiment further provides an electronic device, including the resonant AC/DC converter described in the foregoing embodiment, and further including: a controller, configured to control the resonant AC/DC converter to perform conversion on an alternating current power supply before power is supplied to a load.

Based on the resonant AC/DC converter provided in the foregoing embodiment, an embodiment further provides an adapter, including an input interface, an output interface, a controller, and a resonant AC/DC converter. The input interface is configured to connect to an alternating current power supply. The controller is configured to control the resonant AC/DC converter to perform conversion on the alternating current power supply, and provide a converted voltage to the output interface. The output interface is configured to charge a to-be-charged device.

It can be understood from the foregoing solutions that the embodiments have at least the following advantages:

The resonant AC/DC converter includes a half bridge rectifier circuit, a clamping surge protection circuit, and a resonant DC/DC conversion circuit. Compared with a full bridge rectifier circuit, the half bridge rectifier circuit has one less bridge arm. In other words, two diodes or two switching transistors are saved, thereby reducing a quantity of power electronic devices. In addition, compared with the full bridge rectifier circuit, during operation, the half bridge rectifier circuit reduces power consumption of conducting one diode. Therefore, electric energy conversion efficiency can be increased. The clamping surge protection circuit is connected to the half bridge rectifier circuit in parallel, and the clamping surge protection circuit is connected to a resonant capacitor in the resonant DC/DC conversion circuit in parallel. The clamping surge protection circuit is connected to the resonant capacitor in parallel. Therefore, a voltage of the resonant capacitor may be clamped, to prevent the voltage of the resonant capacitor from exceeding a maximum allowable voltage, thereby protecting the resonant capacitor. In addition, the clamping surge protection circuit can further suppress a surge of the alternating current power supply, to perform surge protection on a subsequent circuit. The clamping surge protection circuit integrates functions of voltage clamping and surge protection. Therefore, there is no need to dispose a surge protection circuit separately, thereby facilitating compactness of the converter, increasing density, and facilitating miniaturization. The resonant DC/DC conversion circuit performs electric energy conversion on a pulsating direct current that is output by the half bridge rectifier circuit before outputting a direct current required by a load. A power conversion circuit provided in this embodiment is implemented by the resonant DC/DC conversion circuit, the resonant DC/DC conversion circuit integrates a function of a PFC circuit and a function of a DC/DC conversion circuit, and the resonant DC/DC conversion circuit includes a transformer. Therefore, signal isolation can be implemented, and there is no need to dispose an isolating circuit. The resonant DC/DC conversion circuit can implement both power factor correction and direct current conversion. Therefore, the resonant DC/DC conversion circuit integrates functions of two stages of conventional power conversion circuits. Compared with the two stages of conventional power conversion circuits, circuit density is increased, a circuit architecture is simplified, and a quantity of power electronic devices is reduced, thereby facilitating miniaturization of the resonant DC/DC conversion circuit and overall miniaturization of a power adapter.

DETAILED DESCRIPTION OF EMBODIMENTS

The following terms "first", "second", and the like are merely intended for a purpose of description, and shall not be understood as an indication or implication of relative importance or implicit indication of a quantity of indicated features. Therefore, a feature limited by "first", "second", or the like may explicitly or implicitly include one or more features. In the descriptions, unless otherwise stated, "a plurality of" means two or more than two.

In addition, directional terms such as "upper" and "lower" may include, but are not limited to, definitions relative to the schematic placements of components in the accompanying drawings. It should be understood that these directional terms may be relative concepts. They are used for relative description and clarification, which may vary accordingly depending on the orientations in which the components are placed in the accompanying drawings.

It should also be noted that the term "connection" should be understood in a broad sense unless otherwise expressly specified and limited. For example, the "connection" may be a fixed connection, or may be a detachable connection, or may be an integral connection; may be a direct connection, or may be an indirect connection through one or more intermediate mediums. In addition, the term "coupling" may be a manner of implementing an electrical connection for signal transmission. The "coupling" may be a direct electrical connection, or may be an indirect electrical connection through one or more intermediate mediums.

An embodiment relates to a resonant alternating current/direct current (AC/DC,) converter. The resonant AC/DC converter may be applied to a scenario of converting an alternating current into a direct current, for example, applied to a power adapter of an electronic device, and may convert a 220 V alternating current of a mains into a direct current that is capable of directly charging the electronic device, to charge the electronic device.

A specific type of the electronic device is not limited in this embodiment. For example, the electronic device may be a wireless device, such as a mobile phone, a tablet computer (or pad), a computer with a wireless transceiver function, a smart wearable product (such as a smartwatch, a smart wristband, or a headset), a virtual reality (VR) end device, or an augmented reality (AR) end device. A range of an output voltage of the resonant AC/DC converter provided in this embodiment may reach 0 V to 60 V, and the output voltage may be adjusted based on a specific application scenario. For example, an output voltage for charging a mobile phone is different from an output voltage for charging a computer.

Figure 1:
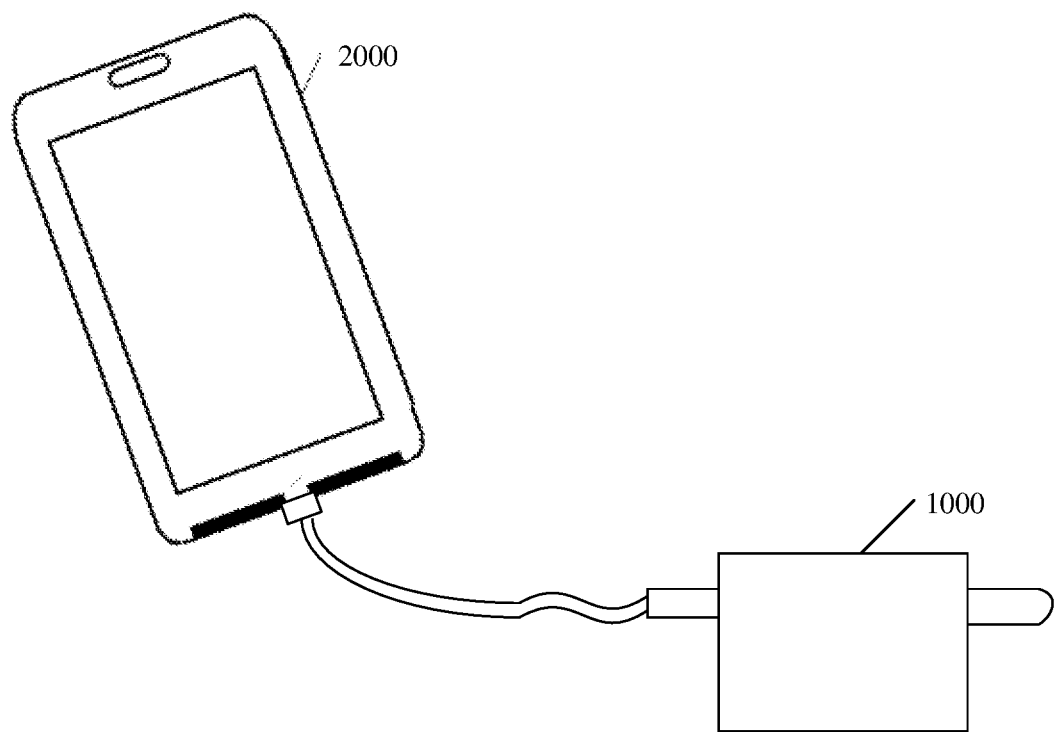
FIG. 1 is a schematic diagram of a power adapter according to an embodiment.

FIG. 1 is a schematic diagram of a power adapter according to an embodiment.

The power adapter 1000 provided in this embodiment includes a resonant AC/DC converter. For example, an alternating current plug of the power adapter 1000 may be directly connected to a 220 V alternating current of mains. That is, the resonant AC/DC converter inside the power adapter 1000 can convert the 220 V alternating current to a pulsating direct current by using a rectifier circuit, and then directly convert, by using a resonant DC/DC conversion circuit, the pulsating direct current into a direct current that is capable of charging a mobile phone 2000. That is, a next-stage circuit of the resonant DC/DC conversion circuit does not need to be connected to a one-stage direct current conversion circuit, but can directly output a charging voltage required by the mobile phone 2000.

To reduce a quantity of power electronic devices inside the power adapter, make an architecture of the power adapter more compact, and implement miniaturization, the resonant AC/DC converter provided in this embodiment includes only one stage of power conversion circuit. The power conversion circuit has both a function of a power factor correction (PFC,) circuit and a function of a DC/DC circuit. An output direct current does not need to be subjected to one-stage direct current conversion, but can directly charge an electronic device. The power conversion circuit in the resonant AC/DC converter provided in this embodiment can directly convert, into a direct current that is capable of charging the electronic device, the pulsating direct current that is output by the rectifier circuit, and two stages of power conversion circuits connected in series are not required. Therefore, an architecture of the power conversion circuit in the power adapter is simplified. In addition, the resonant AC/DC converter provided in this embodiment combines a clamping circuit and a surge protection circuit into one. In this way, the quantity of power electronic devices is also reduced, thereby making the power adapter smaller and easy to carry.

Converter Embodiment

To make a person skilled in the art better understand the solutions provided in the embodiments, the following describes an operating principle of the resonant AC/DC converter provided in this embodiment with reference to the accompanying drawings.

Figure 2:
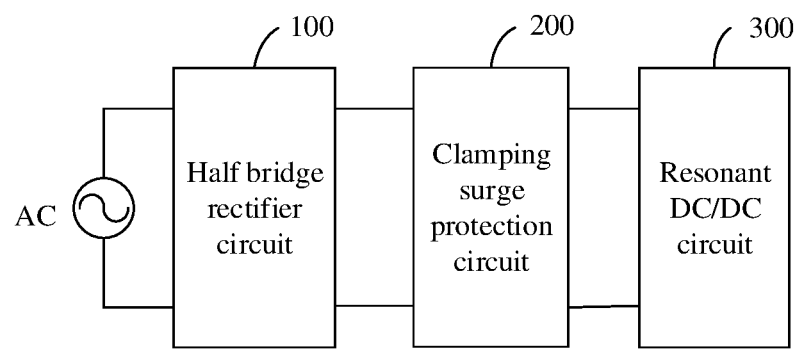
FIG. 2 is a schematic diagram of a resonant AC/DC converter according to an embodiment.

FIG. 2 is a schematic diagram of a resonant AC/DC converter according to an embodiment.

The resonant AC/DC converter provided in this embodiment includes: a half bridge rectifier circuit 100, a clamping surge protection circuit 200, and a resonant DC/DC conversion circuit 300.

An input end of the half bridge rectifier circuit 100 is configured to be connected to an alternating current power supply AC.

The half bridge rectifier circuit 100 is configured to convert an alternating current of the alternating current power supply AC into a pulsating direct current.

A specific implementation form of the half bridge rectifier circuit 100 is not limited in this embodiment. For example, two diodes may be included, one diode is located on an upper bridge arm of a half bridge, and the other diode is located on a lower bridge arm of the half bridge. In addition, alternatively, the half bridge rectifier circuit 100 may include two switching transistors, one switching transistor is located on an upper bridge arm, and the other switching transistor is located on a lower bridge arm, as long as the switching transistors are controlled to implement a same conduction effect as the diodes. In addition, to better implement rectification, each of the two switching transistors may include an anti-parallel diode. The switching transistor herein refers to a controllable switching transistor, that is, a switching state of the switching transistor may be controlled by controlling exerting a driving pulse signal on a gate of the switching transistor. For example, when the driving pulse signal is at a high level, the switching transistor is conducted, and when the driving pulse signal is at a low level, the switching transistor is turned off. Compared with a full bridge rectifier circuit, the half bridge rectifier circuit provided in this embodiment has one less bridge arm. In other words, two diodes or two switching transistors are saved, thereby reducing a quantity of power electronic devices. In addition, compared with the full bridge rectifier circuit, during operation, the half bridge rectifier circuit reduces power consumption of conducting one diode. Therefore, electric energy conversion efficiency can be increased.

The clamping surge protection circuit 200 is connected to the half bridge rectifier circuit 100 in parallel, and the clamping surge protection circuit 200 is connected to a resonant capacitor in the resonant DC/DC conversion circuit 300 in parallel. The resonant capacitor is connected to a bus capacitor in parallel. The half bridge rectifier circuit 100 in this embodiment is connected to a negative electrode of the alternating current power supply, and the clamping surge protection circuit 200 is connected to a positive electrode of the alternating current power supply.

The clamping surge protection circuit 200 includes at least a unilateral conduction component. For example, the unilateral conduction component may be a diode. The diode is conducted only when a voltage of a power supply connected to a positive electrode of the diode is greater than a voltage connected to a negative electrode of the diode.

The clamping surge protection circuit 200 is configured to form a surge voltage when a voltage of the alternating current power supply is greater than a voltage of the bus capacitor, in other words, when the voltage of the alternating current power supply is relatively high. In this case, the clamping surge protection circuit 200 needs to clamp the voltage of the alternating current power supply, to prevent a relatively high surge voltage from entering the resonant DC/DC conversion circuit 300. For example, the diode in the clamping surge protection circuit 200 is conducted, so that energy of the alternating current power supply is released to the bus capacitor, in other words, the energy is absorbed by the bus capacitor. When the voltage of the alternating current power supply is less than or equal to the voltage of the bus capacitor, the resonant DC/DC conversion circuit 300 can normally operate, and the energy of the alternating current power supply can enter the resonant DC/DC conversion circuit 300. However, when the resonant DC/DC conversion circuit 300 normally operates, a voltage of the resonant capacitor in the resonant DC/DC conversion circuit 300 needs to be clamped. A purpose of clamping the voltage of the resonant capacitor by the clamping surge protection circuit 200 is to prevent the voltage of the resonant capacitor from exceeding a maximum allowable voltage, thereby protecting the resonant capacitor, and preventing the resonant capacitor from being broken down by a high voltage during operation.

In addition, the diode in the clamping surge protection circuit 200 can implement different functions when the alternating current power supply has voltage values. That is, when a surge occurs in the alternating current power supply, the diode in the clamping surge protection circuit 200 suppresses the surge, to suppress a spike pulse of the alternating current power supply, that is, to prevent a surge signal of the alternating current power supply from adversely affecting a subsequent circuit. When the alternating current power supply is normal and there is no surge, the diode in the clamping surge protection circuit 200 is configured to clamp the voltage of the resonant capacitor.

Therefore, the clamping surge protection circuit 200 provided in this embodiment integrates a clamping function and a surge protection function. Therefore, it is unnecessary to separately dispose a surge protection circuit. In this way, the quantity of power electronic devices, a volume of the converter, and a weight of the converter can also be reduced.

The resonant DC/DC conversion circuit provided in this embodiment is configured to perform electric energy conversion on the pulsating direct current that is output by the half bridge rectifier circuit, and then perform output. That is, an output voltage can be directly used to charge an electronic device, and does not need to be subjected to direct current conversion. A power conversion circuit provided in this embodiment is implemented by the resonant DC/DC conversion circuit, the resonant DC/DC conversion circuit integrates a function of a PFC circuit and a function of a DC/DC conversion circuit, and the resonant DC/DC conversion circuit includes a transformer. Therefore, signal isolation can be implemented, and there is no need to dispose an isolating circuit. The resonant DC/DC conversion circuit can implement both power factor correction and direct current conversion. Therefore, the resonant DC/DC conversion circuit integrates functions of two stages of conventional power conversion circuits. Compared with the two stages of conventional power conversion circuits, circuit density is increased, a circuit architecture is simplified, and the quantity of power electronic devices is reduced, thereby facilitating miniaturization of the resonant DC/DC conversion circuit and overall miniaturization of a power adapter.

The resonant AC/DC converter provided in this embodiment includes: the half bridge rectifier circuit, the clamping surge protection circuit, and the resonant DC/DC conversion circuit. The clamping surge protection circuit is connected to the half bridge rectifier circuit in parallel, and the clamping surge protection circuit is connected to the resonant capacitor in the resonant DC/DC conversion circuit in parallel. A voltage of a resonant capacitor in the clamping surge protection circuit is clamped and a surge of the alternating current power supply is suppressed. The resonant DC/DC conversion circuit performs electric energy conversion on the pulsating direct current that is output by the half bridge rectifier circuit, and then performs output. The power conversion circuit in the resonant AC/DC converter includes only the resonant DC/DC conversion circuit, and the resonant DC/DC conversion circuit integrates the function of the PFC circuit and the function of the DC/DC conversion circuit. That is, the pulsating direct current can be directly converted into a direct current that is capable of charging the electronic device. The resonant AC/DC converter includes only one stage of power conversion circuit, in other words, combines the end stages of power conversion circuits into one. Therefore, the converter can use a relatively small quantity of power electronic devices, thereby reducing an entire volume of the resonant AC/DC converter, and facilitating miniaturization of the converter. In addition, compared with a full bridge rectifier circuit, the half bridge rectifier circuit provided in this embodiment has one less bridge arm. In other words, two diodes or two switching transistors are saved, thereby reducing the quantity of power electronic devices. In addition, compared with the full bridge rectifier circuit, during operation, the half bridge rectifier circuit reduces power consumption of conducting one diode. Therefore, the half bridge rectifier circuit can be used to reduce power consumption for conduction and increase efficiency. Therefore, the resonant AC/DC converter can implement high density and high efficiency.

Figure 3A:
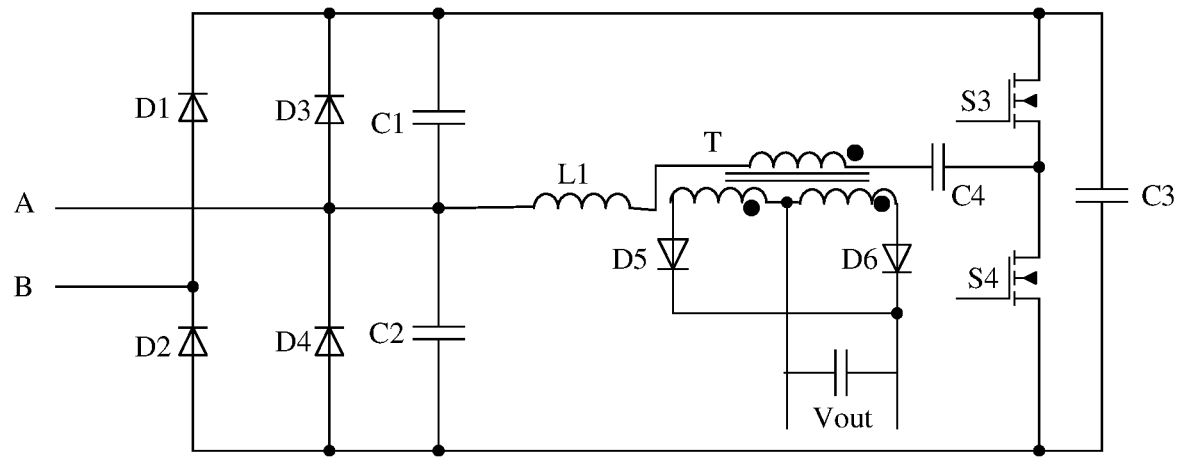
FIG. 3A is a schematic diagram of another resonant AC/DC converter according to an embodiment.

FIG. 3A is a schematic diagram of another resonant AC/DC converter according to an embodiment.

An example in which a half bridge rectifier circuit in the resonant AC/DC converter provided in this embodiment includes diodes is used for description.

The half bridge rectifier circuit includes a first diode D1 and a second diode D2. An end A and an end B are connected to two ends of an alternating current power supply, the end A is connected to a positive electrode of the alternating current power supply, and the end B is connected to a negative electrode of the alternating current power supply. A positive electrode of the first diode D1 is connected to the end B, a negative electrode of the first diode D1 is connected to a positive electrode of a bus, a positive electrode of the second diode D2 is connected to a negative electrode of the bus, and a negative electrode of the second diode D2 is connected to the end B.

The half bridge rectifier circuit plays a role in rectifying an input alternating current into a pulsating direct current.

The half bridge rectifier circuit provided in this embodiment includes only one bridge arm, and is not a conventional full bridge rectifier circuit that includes two bridge arms. Therefore, the full bridge rectifier circuit includes more power electronic devices. When the rectifier circuit operates, at least two switching transistors or diodes of the full bridge rectifier circuit are conducted, thereby leading to relatively large conduction losses.

A clamping surge protection circuit includes a third diode D3 and a fourth diode D4. A positive electrode of the third diode D3 is connected to the end A, and a negative electrode of the third diode D3 is connected to the positive electrode of the bus. A negative electrode of the fourth diode D4 is connected to the end A, and a positive electrode of the fourth diode D4 is connected to the negative electrode of the bus. In other words, after the third diode D3 is connected to the fourth diode D4 in series, the third diode D3 and the fourth diode D4 are connected to a bus capacitor C3 in parallel.

A resonant DC/DC conversion circuit includes: a third switching transistor S3, a fourth switching transistor S4, a resonant capacitor, a first resonant inductor L1, and a transformer T.

In a possible implementation, a primary-side winding of the transformer T may also participate in LC resonance.

The resonant capacitor in this embodiment includes two separate capacitors. In other words, the resonant capacitor includes at least a first resonant capacitor C1 and a second resonant capacitor C2.

A first end of the first resonant capacitor C1 is connected to the positive electrode of the bus, a second end of the first resonant capacitor C1 is connected to the end A, a first end of the second resonant capacitor C2 is connected to the end A, and a second end of the second resonant capacitor C2 is connected to the negative electrode of the bus. In other words, after the first resonant capacitor C1 is connected to the second resonant capacitor C2 in series, the first resonant capacitor C1 and the second resonant capacitor C2 are connected to the bus capacitor C3 in parallel.

A first end of the first resonant inductor L1 is connected to the end A, and a second end of the first resonant inductor L1 is connected to an undotted end of the primary-side winding of the transformer T.

The third diode D3 and the fourth diode D4 form a clamping circuit for the first resonant capacitor C1 and the second resonant capacitor C2. The third diode D3 and the fourth diode D4 are connected in series between the positive electrode of the bus and the negative electrode of the bus, the first resonant capacitor C1 and the second resonant capacitor C2 are connected in series between the positive electrode of the bus and the negative electrode of the bus, the third diode D3 is connected to the first resonant capacitor C1 in parallel, and the fourth diode D4 is connected to the second resonant capacitor C2 in parallel. Therefore, the third diode D3 can clamp a voltage at the two ends of the second resonant capacitor C2, and the fourth diode D4 can clamp a voltage at the two ends of the first resonant capacitor C1.

A specific operating principle of the clamping surge protection circuit is described below with reference to the accompanying drawing.

First, the operating principle of surge protection is described. When a voltage of the alternating current power supply connected to the end A and the end B is relatively high, for example, a voltage of the end A is greater than a voltage of the bus capacitor C3, the third diode D3 is conducted, and a surge voltage of the end A is clamped to the bus, that is, released to the bus capacitor C3, and absorbed by the bus capacitor C3, thereby preventing a relatively high surge voltage from entering the resonant DC/DC conversion circuit to cause damage to the resonant DC/DC conversion circuit. Similarly, when a voltage of the end B is relatively high, equivalently, the end A has a relatively high negative voltage, the fourth diode D4 is conducted, to release a surge voltage to a ground of the bus.

A clamping action of the clamping surge protection circuit is described below.

When the voltage of the alternating current power supply connected to the end A and the end B is less than or equal to the voltage of C3, it indicates that the voltage of the alternating current power supply is normal and no surge exists. That is, the voltage of the end A is not higher than the voltage of C3. In this case, energy of the alternating current power supply can enter the resonant DC/DC conversion circuit. In other words, the resonant DC/DC conversion circuit can normally operate. During operation of the resonant DC/DC conversion circuit, to protect the first resonant capacitor C1 and the second resonant capacitor C2, the third diode D3 may be configured to clamp a voltage of the second resonant capacitor C2, and the fourth diode D4 may be configured to clamp a voltage of the first resonant capacitor C1.

A resonance form of the resonant DC/DC conversion circuit is not limited in this embodiment. In the following embodiments, an example in which a resonant circuit in the resonant DC/DC conversion circuit is an LC resonance circuit is used as an example for description. For example, the resonant circuit may also be an LCC resonance circuit, an LLC resonance circuit, or an LCCL resonance circuit.

In addition, the third diode D3 and the fourth diode D4 may further implement a surge protection function, that is, clamping a surge signal to prevent the surge signal from affecting a subsequent circuit.

In this embodiment, an example in which a secondary-side rectifier circuit connected to the transformer T is a full-wave rectifier circuit is used for description. That is, a dotted end of a secondary-side winding of the transformer T is connected to a first end of an output end by using a sixth diode D6, an undotted end of the secondary-side winding of the transformer T is connected to the first end of the output end by using a fifth diode D5, and a central tap of the secondary-side winding of the transformer T is connected to a second end of the output end. That is, the output end is a power supply output end of the resonant AC/DC converter. A voltage that is output by the output end is not limited in this embodiment, and may be set based on an actual need of an application scenario. For example, a voltage below 60 V may be output. For example, 56 V, 58 V, 12 V, 5 V, or 3.3 V is output. The foregoing several voltages are merely examples.

It should be understood that the secondary-side rectifier circuit connected to the transformer in the resonant DC/DC conversion circuit in this embodiment is described by using full-wave rectification as an example. In addition, alternatively, the secondary-side rectifier circuit may be a full bridge rectifier circuit or a half bridge rectifier circuit. This is not limited in this embodiment.

A dotted end of the primary-side winding of the transformer T is connected to a second end of the third switching transistor S3 by using a direct current blocking capacitor C4, a first end of the third switching transistor S3 is connected to the positive electrode of the bus, the second end of the third switching transistor S3 is connected to a first end of the fourth switching transistor S4, and a second end of the fourth switching transistor S4 is connected to the negative electrode of the bus. The direct current blocking capacitor C4 plays a role in blocking a direct current component.

A first end of the bus capacitor C3 is connected to the positive electrode of the bus, and a second end of the bus capacitor C3 is connected to the negative electrode of the bus.

The first resonant capacitor C1, the second resonant capacitor C2, and the first resonant inductor L1 form an LC resonant circuit. The transformer T, the first resonant inductor L1, the fourth capacitor C4, the third switching transistor S3, the fourth switching transistor S4, and the third capacitor C3 form a PFC circuit and a DC/DC circuit.

The half bridge rectifier circuit described in the foregoing embodiment uses a diode as an example, that is, is a passive half bridge rectifier circuit. The following uses an example in which the half bridge rectifier circuit includes a switching transistor, that is, is an active rectifier half bridge circuit. A switching state of the switching transistor may be actively controlled. This is different from the diode. The diode is automatically conducted only when a voltage of a positive electrode of the diode is greater than a voltage of a negative electrode thereof, while the switching transistor may be conducted through control in advance. That is, a conduction angle is controllable. In addition, when the switching state of the switching transistor is not actively controlled, a diode that is anti-parallel connected to the switching transistor may function as a common diode. In other words, an operating principle of the common diode is the same as the operating principle of the diode included in the half-bridge rectifier circuit described in the foregoing embodiment. A specific type of the switching transistor is not limited in this embodiment. For example, the switching transistor may be a metal-oxide-semiconductor field-effect transistor (MOSFET,) or an insulated gate bipolar transistor (IGBT).

Figure 3B:
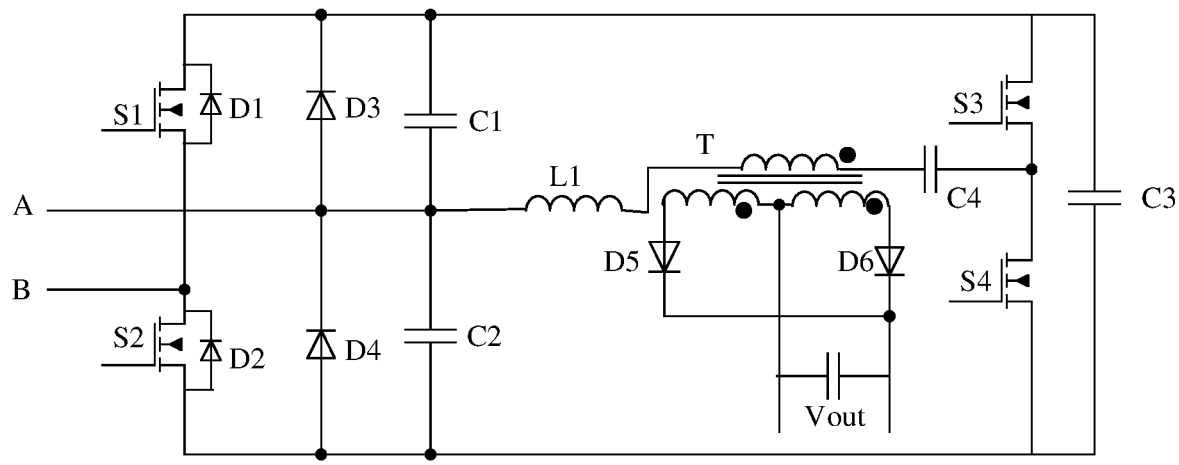
FIG. 3B is a schematic diagram of still another resonant AC/DC converter according to an embodiment.

FIG. 3B is a schematic diagram of still another resonant AC/DC converter according to an embodiment.

A rectifier circuit shown in FIG. 3B includes a first switching transistor S1 and a second switching transistor S2. That is, the first switching transistor S1 is located on an upper bridge arm, and the second switching transistor S2 is located on a lower bridge arm. When a half bridge rectifier circuit provided in this embodiment includes one or more switching transistors, a controller of the converter needs to control switching states of the switching transistors. In an implementation, the controller may control the first switching transistor S1 to implement a same function and operating principle as the first diode D1 in FIG. 2, and control the second switching transistor S2 to implement a same function and operating principle as the second diode D2 in FIG. 2. In another implementation, the controller may control a conduction time of the first switching transistor S1 and a conduction time of the second switching transistor S2, to implement functions different from the functions of the first diode D1 and the second diode D2 in FIG. 2.

In a possible implementation, the first switching transistor S1 may have its own anti-parallel diode D1, and the second switching transistor S2 may have its own anti-parallel diode D2. It should be understood that, when the first switching transistor S1 and the second switching transistor S2 are not controlled, the first diode D1 and the second diode D2 can respectively implement the same functions as the first diode D1 and the second diode D2 in FIG. 3A. Details are not described herein again.

The resonant AC/DC converter may further include the controller. The controller may control a switching state of the first switching transistor S1 and a switching state of the second switching transistor S2. For example, when each of the first switching transistor S1 and the second switching transistor S2 is a MOS transistor, the controller controls the switching state of the first switching transistor S1 and the switching state of the second switching transistor S2 by sending a driving pulse signal to a gate of the first switching transistor S1 and a gate of the second switching transistor S2. It should be understood that a frequency corresponding to the first switching transistor S1 and the second switching transistor S2 is consistent with a frequency of an input voltage of an alternating current power supply, and is a power frequency. However, a third switching transistor S3 and a fourth switching transistor S4 correspond to a high frequency of a resonant DC/DC circuit. That is, a switching frequency of the third switching transistor S3 and the fourth switching transistor S4 is higher than the switching frequency of the first switching transistor S1 and the second switching transistor S2.

The operating principles of circuit topologies corresponding to FIG. 3A and FIG. 3B are respectively analyzed below with reference to current path diagrams.

Figure 4:
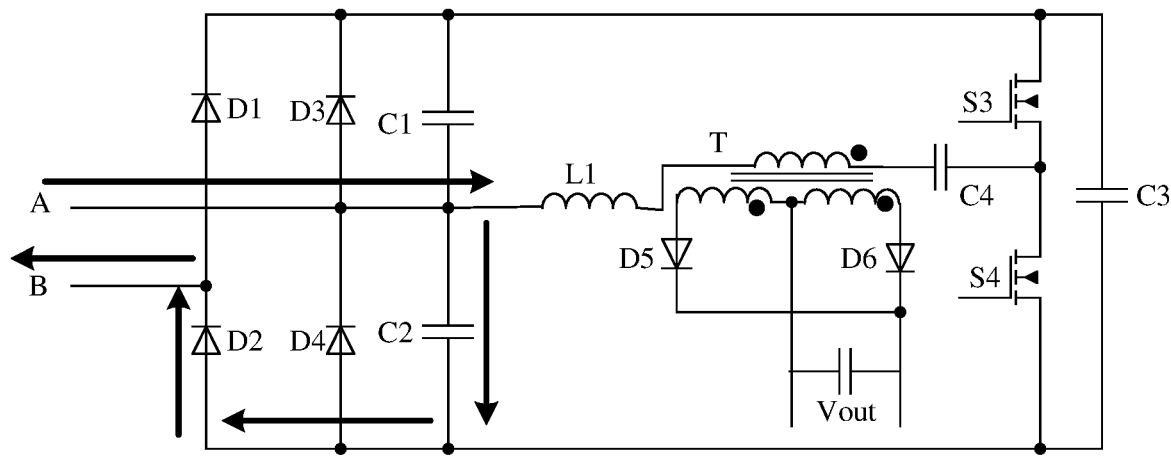
FIG. 4 is a diagram of a path in a case that an input voltage corresponding to FIG. 3A is in a positive half cycle according to an embodiment.

FIG. 4 is a diagram of a path in a case that an input voltage corresponding to FIG. 3A is in a positive half cycle according to an embodiment.

The following describes the operating principle of the resonant AC/DC converter when an alternating current voltage is in a positive half cycle. Three operating states are described below. The three operating states are a resonant state, an input clamping state, and a bus clamping state respectively.

Manner 1:

A voltage Vc2 of the second resonant capacitor C2 is greater than an input voltage Vin and Vc2 is less than a bus voltage Vc3 (which is the voltage at the two ends of the bus capacitor C3), that is, Vc3>Vc2>Vin. In this case, although the input voltage is in the positive half cycle, the second diode D2 is not conducted, that is, the input voltage Vin is not exerted on the second resonant capacitor C2. Therefore, an alternating current cannot transfer energy to a next-stage circuit. In this case, the second resonant capacitor C2 provides energy for the next-stage circuit, a resonant circuit operates in an LC resonant state or an LCC resonant state, and the primary-side winding of the transformer T transfers energy to the secondary-side winding.

Manner 2:

A voltage Vc2 of the second resonant capacitor C2 is less than an input voltage Vin, that is, Vc2<Vin. Because the input voltage is greater than the voltage of the second resonant capacitor C2, the second diode D2 is conducted, and an input current flows through the second resonant capacitor C2 and the second diode D2. In other words, a current path in a case that the alternating current voltage is in the positive half cycle and the second diode D2 is conducted is shown by using bold lines with arrows in FIG. 4. When the second diode D2 is conducted, a clamping state of the input voltage is entered, the input voltage Vin clamps the voltage Vc2 of the second resonant capacitor C2 by using the second diode D2, that is, Vin is equal to a sum of the voltage of the second resonant capacitor C2 and a voltage of the second diode D2, and the voltage of C2 is clamped by the input voltage Vin. The entire transformer T is in a rectified PFC state, and absorbs energy from an alternating current input end. Some of the energy is transferred from the primary-side winding of the transformer T to the secondary-side winding, and some of the energy is transferred to the bus, that is, stored in the bus capacitor C3.

Manner 3:

A voltage Vc2 of the second resonant capacitor C2 is greater than a bus voltage Vbus, that is, Vc2>Vbus, and a clamping state of the bus voltage is entered. When the second diode D2 is conducted, the voltage of the second resonant capacitor C2 is increasing, and the voltage of the first resonant capacitor C1 is decreasing. When the voltage of the first resonant capacitor C1 decreases to 0, the voltage of the second resonant capacitor C2 is equal to the bus voltage. If C2 continues to increase, that is, the voltage of the second resonant capacitor C2 is greater than the bus voltage, the third diode D3 is conducted. When the third diode D3 is conducted, the voltage of the second resonant capacitor C2 is clamped by the third diode D3 to the input voltage. That is, when the third diode D3 is conducted, the bus voltage is equal to the voltage of the third diode D3 plus the voltage of the second resonant capacitor C2. If a self-voltage drop of the third diode D3 is ignored, the voltage of the second resonant capacitor C2 is equal to the bus voltage. That is, energy stored in the resonant capacitor and energy stored in the first resonant inductor are fed back to the bus.

With reference to FIG. 4, the foregoing describes the operating states of the resonant AC/DC converter in a case that the input voltage of the alternating current input end corresponds to the positive half cycle. The following describes operating states of the resonant AC/DC converter in a case that the input voltage of the alternating current input end corresponds to a negative half cycle.

Figure 5:
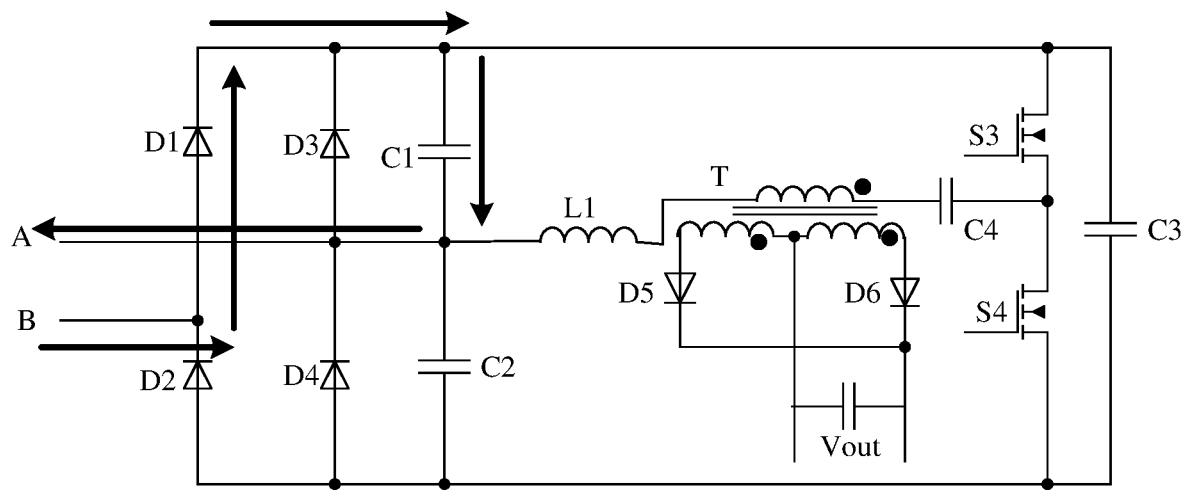
FIG. 5 is a diagram of a path in a case that an input voltage corresponding to FIG. 3A is in a negative half cycle according to an embodiment.

FIG. 5 is a diagram of a path in a case that an input voltage corresponding to FIG. 3A is in a negative half cycle according to an embodiment.

When the input voltage corresponds to the negative half cycle, the resonant AC/DC converter also has three operating states. The three operating states are separately described below.

Manner 1:

A voltage Vc1 of the first resonant capacitor C1 is greater than an input voltage Vin, and Vc1 is less than a bus voltage Vc3 (which is the voltage at the two ends of the bus capacitor C3), that is, Vc3>Vc1>Vin. In this case, the voltage of the first resonant capacitor C1 is greater than the input voltage. Therefore, the first diode D1 is not conducted, the input voltage is not exerted on the first resonant capacitor C1, and an alternating current cannot transfer energy to a next-stage circuit. In this case, the bus capacitor C3 provides energy for the next-stage circuit, a resonant circuit operates in an LC resonant state or an LCC resonant state, and the primary-side winding of the transformer T transfers energy to the secondary-side winding. It should be understood that, when the input voltage cannot provide energy for the secondary-side winding of the transformer T, the bus capacitor C3 may provide energy for the secondary-side winding of the transformer T.

Manner 2:

A voltage Vc1 of the first resonant capacitor C1 is less than an input voltage Vin, that is, Vc1<Vin. Because the input voltage Vin is greater than the voltage of the first resonant capacitor C1, the first diode D1 is conducted. In this case, the input voltage flows through the first diode D1 and is exerted on the first resonant capacitor C1. A current path in a case that the alternating current voltage is in the negative half cycle and the first diode D1 is conducted is shown by using bold lines with arrows in FIG. 5. When the first diode D1 is conducted, a clamping state of the input voltage is entered, the input voltage clamps the voltage of the first resonant capacitor C1 by using the first diode D1, that is, a sum of a voltage of the first diode D1 and the voltage of the first resonant capacitor C1 is equal to the input voltage. When a voltage drop of the first diode D1 is ignored, the voltage of the first resonant capacitor C1 is equal to the input voltage. The entire circuit is in a rectified PFC state, and absorbs energy from an alternating current input end (a power side). Some of the energy is transferred from the primary-side winding of the transformer T to the secondary-side winding, and some of the energy is transferred to the bus, that is, stored in the bus capacitor C3.

Manner 3:

A voltage Vc1 of the first resonant capacitor C1 is greater than a bus voltage Vbus, that is, Vc1>Vbus, and a clamping state of the bus voltage is entered. An operating process is analyzed below. When the voltage of the first resonant capacitor C1 increases, the voltage of the second resonant capacitor C2 decreases. When the voltage of the second resonant capacitor C2 decreases to 0, the voltage of the first resonant capacitor C1 is equal to the bus voltage. In this case, the input voltage clamps the voltage of the second resonant capacitor C2 by using the third diode D3, and the energy stored in the resonant capacitor and the energy stored in the first resonant inductor are fed back to the bus.

In the circuit diagram shown in FIG. 3B, although the half bridge rectifier circuit includes the switching transistor, operating states of the half bridge rectifier circuit may be the same as those in FIG. 4 and FIG. 5. Operating states in which an input voltage corresponds to a positive half cycle and operating states in which an input voltage corresponds to a negative half cycle are separately described below with reference to FIG. 6 and FIG. 7.

Figure 6:
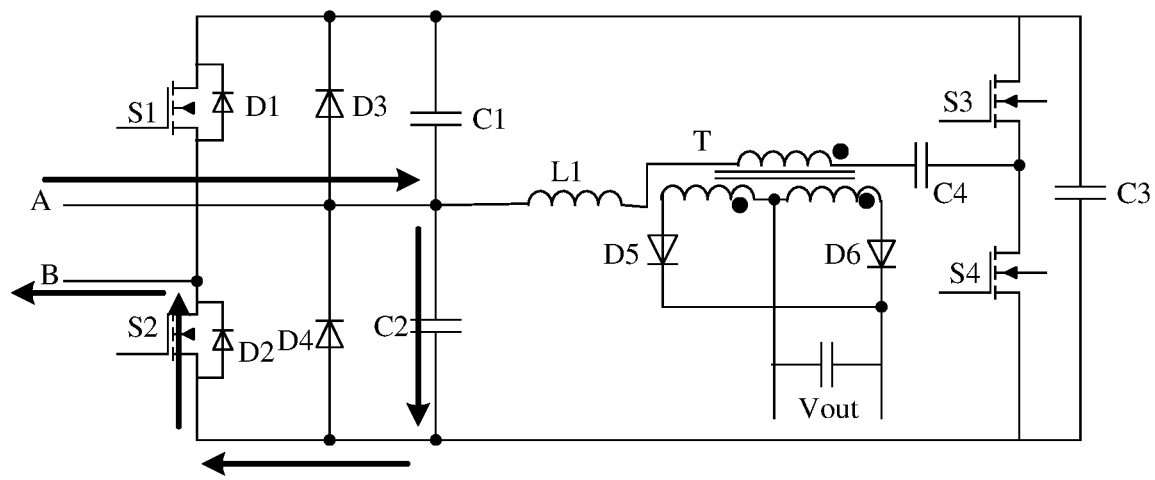
FIG. 6 is a diagram of a path in a case that an input voltage corresponding to FIG. 3B is in a positive half cycle according to an embodiment.

FIG. 6 is a diagram of a path in a case that an input voltage corresponding to FIG. 3B is in a positive half cycle according to an embodiment.

The following describes the operating principle of the resonant AC/DC converter when an alternating current voltage is in a positive half cycle. Three operating states are described below. The three operating states are a resonant state, an input clamping state, and a bus clamping state respectively.

Manner 1:

A voltage Vc2 of the second resonant capacitor C2 is greater than an input voltage Vin and Vc2 is less than a bus voltage Vc3 (which is the voltage at the two ends of the bus capacitor C3), that is, Vc3>Vc2>Vin. In this case, although the input voltage is in the positive half cycle, the second diode D2 is not conducted, that is, the input voltage Vin is not exerted on the second resonant capacitor C2. Therefore, an alternating current cannot transfer energy to a next-stage circuit. In this case, the second resonant capacitor C2 provides energy for the next-stage circuit, a resonant circuit operates in an LC resonant state or an LCC resonant state, and the primary-side winding of the transformer T transfers energy to the secondary-side winding.

Manner 2:

A voltage Vc2 of the second resonant capacitor C2 is less than an input voltage Vin, that is, Vc2<Vin. Because the input voltage is greater than the voltage of the second resonant capacitor C2, the second diode D2 is conducted, and an input current flows through the second resonant capacitor C2 and the second diode D2. In other words, a current path in a case that the alternating current voltage is in the positive half cycle and the second diode D2 is conducted is shown by using bold lines with arrows in FIG. 6. When the second diode D2 is conducted, regardless of whether the second switching transistor S2 is conducted in this case, a clamping state of the input voltage is entered, the input voltage Vin clamps the voltage Vc2 of the second resonant capacitor C2 by using D4 or D2, that is, Vin is equal to a sum of the voltage of the second resonant capacitor C2 and a voltage of the second diode D2, and the voltage of C2 is clamped by the input voltage Vin. The entire transformer T is in a rectified PFC state, and absorbs energy from an alternating current input end. Some of the energy is transferred from the primary-side winding of the transformer T to the secondary-side winding, and some of the energy is transferred to the bus, that is, stored in the bus capacitor C3.

Manner 3:

A voltage Vc2 of the second resonant capacitor C2 is greater than a bus voltage Vbus, that is, Vc2>Vbus, and a clamping state of the bus voltage is entered. When the second diode D2 is conducted, the voltage of the second resonant capacitor C2 is increasing, and the voltage of the first resonant capacitor C1 is decreasing. When the voltage of the first resonant capacitor C1 decreases to 0, the voltage of the second resonant capacitor C2 is equal to the bus voltage. If C2 continues to increase, that is, the voltage of the second resonant capacitor C2 is greater than the bus voltage, the third diode D3 is conducted. When the third diode D3 is conducted, the voltage of the second resonant capacitor C2 is clamped by the third diode D3 to the input voltage. That is, when the third diode D3 is conducted, the bus voltage is equal to the voltage of the third diode D3 plus the voltage of the second resonant capacitor C2. If a self-voltage drop of the third diode D3 is ignored, the voltage of the second resonant capacitor C2 is equal to the bus voltage. That is, energy stored in the resonant capacitor and energy stored in the first resonant inductor are fed back to the bus.

With reference to FIG. 6, the foregoing describes the operating states of the resonant AC/DC converter in a case that the input voltage of the alternating current input end corresponds to the positive half cycle. The following describes operating states of the resonant AC/DC converter in a case that the input voltage of the alternating current input end corresponds to a negative half cycle.

Figure 7:
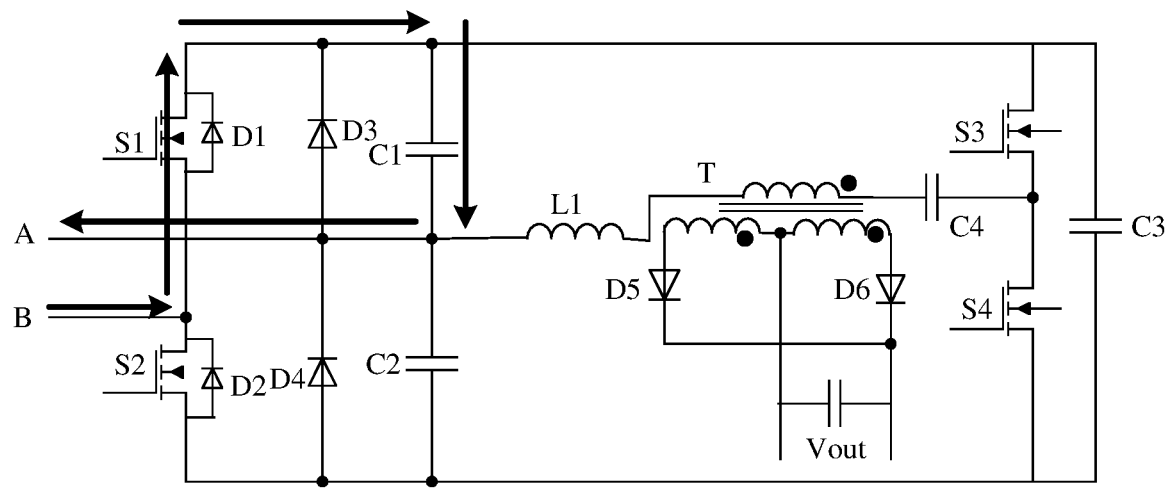
FIG. 7 is a diagram of a path in a case that an input voltage corresponding to FIG. 3B is in a negative half cycle according to an embodiment.

FIG. 7 is a diagram of a path in a case that an input voltage corresponding to FIG. 3B is in a negative half cycle according to an embodiment.

When the input voltage corresponds to the negative half cycle, the resonant AC/DC converter also has three operating states. The three operating states are separately described below.

Manner 1:

A voltage Vc1 of the first resonant capacitor C1 is greater than an input voltage Vin, and Vc1 is less than a bus voltage Vc3 (which is the voltage at the two ends of the bus capacitor C3), that is, Vc3>Vc1>Vin. In this case, the voltage of the first resonant capacitor C1 is greater than the input voltage. Therefore, the first diode D1 is not conducted, the input voltage is not exerted on the first resonant capacitor C1, and an alternating current cannot transfer energy to a next-stage circuit. In this case, the bus capacitor C3 provides energy for the next-stage circuit, a resonant circuit operates in an LC resonant state or an LCC resonant state, and the primary-side winding of the transformer T transfers energy to the secondary-side winding. It should be understood that, when the input voltage cannot provide energy for the secondary-side winding of the transformer T, the bus capacitor C3 may provide energy for the secondary-side winding of the transformer T.

Manner 2:

A voltage Vc1 of the first resonant capacitor C1 is less than an input voltage Vin, that is, Vc1<Vin. Because the input voltage Vin is greater than the voltage of the first resonant capacitor C1, the first diode D1 is conducted, and in this case, an input voltage is exerted on the first resonant capacitor C1 by using the first diode D1. A current path in a case that the alternating current voltage is in the negative half cycle and the first diode D1 is conducted is shown by using bold lines with arrows in FIG. 7. When the first diode D1 is conducted, a clamping state of the input voltage is entered, the input voltage clamps the voltage of the first resonant capacitor C1 by using the first diode D1, that is, a sum of a voltage of the first diode D1 and the voltage of the first resonant capacitor C1 is equal to the input voltage. When a voltage drop of the first diode D1 is ignored, the voltage of the first resonant capacitor C1 is equal to the input voltage. The entire circuit is in a rectified PFC state, and absorbs energy from an alternating current input end (a power side). Some of the energy is transferred from the primary-side winding of the transformer T to the secondary-side winding, and some of the energy is transferred to the bus, that is, stored in the bus capacitor C3.

Manner 3:

A voltage Vc1 of the first resonant capacitor C1 is greater than a bus voltage Vbus, that is, Vc1>Vbus, and a clamping state of the bus voltage is entered. An operating process is analyzed below. When the voltage of the first resonant capacitor C1 increases, the voltage of the second resonant capacitor C2 decreases. When the voltage of the second resonant capacitor C2 decreases to 0, the voltage of the first resonant capacitor C1 is equal to the bus voltage. In this case, the input voltage clamps the voltage of the second resonant capacitor C2 by using the third diode D3. In this case, the voltage of the second resonant capacitor C2 is 0, and the energy stored in the resonant capacitor and the energy stored in the first resonant inductor are fed back to the bus.

The operating principle of the foregoing three states is the same as that for the case that the rectifier circuit includes a diode. However, after the diode that is anti-parallel connected to the switching transistor is conducted, the switching transistor may be conducted through control. As a voltage drop of the diode exists during conduction of the diode, losses caused by the conduction of the diode are reduced, and conduction losses of the switching transistor are less than those of the diode. Therefore, electric energy conversion efficiency can be increased.

The following describes the operating principle of actively controlling an action of the first switching transistor S1 and an action of the second switching transistor S2.

First, the operating principle of actively controlling the switching transistor in the half bridge rectifier circuit to be conducted is described.

When the input voltage is in the positive half cycle, the second switching transistor S2 is conducted through control, and the first switching transistor S1 is turned off through control. For a current path, refer to FIG. 6. Because the second switching transistor S2 is conducted, the input voltage Vin may be exerted on the second resonant capacitor C2. This is different from the foregoing analyzed operating state in which there is no second switching transistor S2 but only the second diode D2. If there is no second switching transistor S2, the current path shown in FIG. 6 exists only when the input voltage Vin is greater than the voltage of the second resonant capacitor C2. However, when the rectifier circuit includes a controllable switching transistor, in the positive half cycle of the input voltage, as long as the second switching transistor S2 is conducted, the input voltage Vin forms the current path shown by using the bold lines with arrows in FIG. 6. That is, energy of the alternating current input end may be transferred to the resonant DC/DC conversion circuit. The voltage Vc2 of the second resonant capacitor C2 is clamped by the input voltage Vin. In this case, the entire converter works in a rectified PFC state, to absorb energy from a power side. Some of the energy is transferred from the primary-side winding of the transformer to the secondary-side winding.

When the input voltage is in the negative half cycle, the first switching transistor S1 is conducted through control, and the second switching transistor S2 is turned off through control. For a current path, refer to FIG. 7. Because the first switching transistor S1 is conducted, the input voltage Vin is exerted on the first resonant capacitor C1. This is different from the foregoing analyzed operating state in which there is no first switching transistor S1 but only the first diode D1. If there is no first switching transistor S1, the current path shown in FIG. 7 exists only when the input voltage Vin is greater than the voltage of the first resonant capacitor C1. However, when the rectifier circuit includes a controllable switching transistor, in the negative half cycle of the input voltage, as long as the first switching transistor S1 is conducted, the input voltage Vin forms the current path shown by using the bold lines with arrows in FIG. 7. That is, energy of the alternating current input end may be transferred to the resonant DC/DC conversion circuit. The voltage Vc1 of the first resonant capacitor C1 is clamped by the input voltage Vin. In this case, the entire converter works in a rectified PFC state, to absorb energy from a power side. Some of the energy is transferred from the primary-side winding of the transformer to the secondary-side winding.

When the switching transistor of the rectifier circuit is actively controlled to act, the switching transistor can be conducted in advance through control without waiting until a voltage is greater than a forward bias voltage of the diode, thereby expanding a conduction angle and making electric energy conversion more flexible. For example, if a load of the converter is a light load, the conduction angle may be smaller; and if the load of the converter is a heavy load, the conduction angle may be larger.

The following describes the operating principle of actively controlling the switching transistor in the half bridge rectifier circuit to be turned off.

If both the first switching transistor S1 and the second switching transistor S2 of the rectifier circuit are turned off through active control, when the input voltage corresponds to the positive half cycle, the voltage of the second resonant capacitor C2 is higher than the input voltage Vin; and when the input voltage corresponds to the negative half cycle, the voltage of the first resonant capacitor C1 is higher than the input voltage Vin, both the anti-parallel diodes D1 and D2 respectively corresponding to the first switching transistor S1 and the second switching transistor S2 are turned off, and the next-stage circuit is disconnected from the alternating current input end. That is, energy of the alternating current input end cannot be transferred to the resonant DC/DC conversion circuit, and the resonant DC/DC conversion circuit operates in a common LC or LCC resonant state. In this case, energy is transferred from the primary-side winding of the transformer to the secondary-side winding.

It can be understood that, in the circuit shown in any one of FIG. 3A to FIG. 9, the two diodes D3 and D4 of the clamping surge protection circuit provided in the embodiments do not participate in rectification and conversion, and therefore, are not a part of the full bridge rectifier circuit. In principle, the rectifier circuit formed by D1 and D2 is not a bridge rectifier circuit, but a bridgeless rectifier circuit. During normal operation, in a power frequency operating cycle of the alternating current power supply, the two diodes D3 and D4 of the clamping surge protection circuit do not operate, that is, are not conducted. D3 and D4 are conducted only when clamping needs to be performed for the first resonant capacitor or the second resonant capacitor. During operation of the half bridge rectifier circuit provided in this embodiment, in the positive half cycle or the negative half cycle of the alternating current power supply, the half bridge rectifier circuit has only one diode conducted. Therefore, compared with the full bridge rectifier circuit, the half bridge rectifier circuit in this embodiment saves one diode, thereby reducing power consumption of one diode. Therefore, conduction loses are reduced, and power supply efficiency of the power supply is increased.

The resonant AC/DC converter provided in this embodiment can suppress a power frequency pulsed power. An operating principle is described below in detail. As the load of the converter increases, a range of a state of clamping the resonant capacitor by an input voltage in a power frequency cycle increases. As the input voltage increases, a duty cycle of an operating range of clamping by the input voltage increases, an input power increases, and an operating time of a resonance interval is relatively reduced. Therefore, an effective duty cycle of transferring energy to the secondary-side winding by the primary-side winding of the transformer decreases. That is, a gain of the resonant DC/DC conversion circuit is controlled by adjusting a frequency at a high-voltage stage, instead of transferring all energy at the high voltage stage to the secondary-side winding of the transformer, and redundant energy is stored on the bus capacitor, so that an output end generates no relatively large power frequency pulse ripple, thereby implementing an effect of suppressing a power frequency pulse. The high voltage stage herein is a stage at which an input voltage of an alternating current input end is relatively high.

In addition, the resonant AC/DC converter provided in this embodiment can implement a gain within a relatively wide range. For example, the gain may be adjusted by adjusting a resonance frequency of the resonant DC/DC conversion circuit, thereby ensuring that when the converter is applied to a power adapter, the power adapter can provide an output voltage within a relatively wide range, and may be applied to different intelligent ends. For example, the power adapter may be applied to a mobile phone and a tablet computer or a laptop computer. In this way, a plurality of intelligent ends can share one power adapter, thereby reducing costs for a user.

In addition, a degree of freedom of control may be increased by shifting a phase on a primary side and a secondary side of the transformer, for example, changing a time difference between a conduction moment of a switching transistor that is on a bridge arm and that is connected to the primary-side winding of the transformer and a conduction moment of a switching transistor that is on a bridge arm and that is connected to the secondary-side winding. A switching state of a switching transistor is determined by a corresponding driving pulse signal, and a phase of the driving pulse signal determines a conduction moment of the switching transistor. Therefore, phase shifting is performed to generate a phase difference, that is, a phase shift angle, between driving pulse signals corresponding to the switching transistors on the two bridge arms. If phases of the driving pulse signals corresponding to the switching transistors on the two bridge arms are the same, that is, the phase shift angle is 0, the switching transistors on the two bridge arms are synchronously conducted. The degree of freedom herein is a selectable quantity of controllable variables. A greater quantity of controllable variables leads to a higher degree of freedom of the circuit, and more convenience in controlling the circuit, so that a voltage of the bus of the converter can be adjusted.

Herein, an equivalent voltage at a midpoint of a bridge arm and an equivalent voltage on a secondary-side transformer may be controlled through phase-shift control, so that energy transferred to a secondary side may be adjusted and energy transferred to the bus may be controlled, thereby adjusting the voltage of the bus. This is also true to a PF value.

To improve quality of an output voltage, the resonant AC/DC converter provided in this embodiment may further include a filter circuit. The filter circuit is described below in detail with reference to the accompanying drawings.

Figure 8:
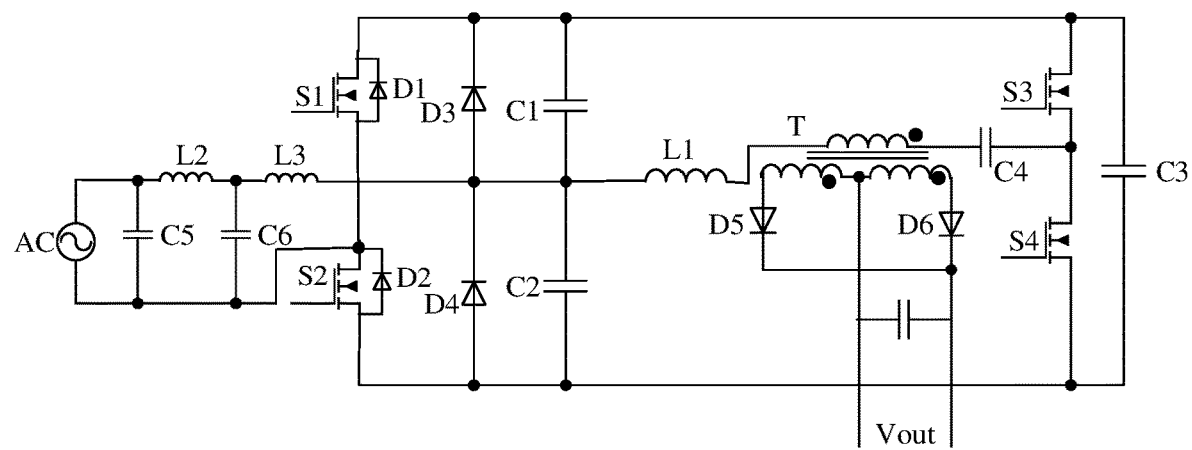
FIG. 8 is a schematic diagram of yet another resonant AC/DC converter according to an embodiment.

FIG. 8 is a schematic diagram of another resonant AC/DC converter according to an embodiment.

The filter circuit in the resonant AC/DC converter provided in this embodiment includes: a fifth capacitor C5, a sixth capacitor C6, a second inductor L2, and a third inductor L3.

An input positive electrode of the filter circuit is connected to a positive electrode of an alternating current power supply AC, and an input negative electrode of the filter circuit is connected to a negative electrode of the alternating current power supply AC.

A first end of the fifth capacitor C5 is connected to the input positive electrode of the filter circuit, a second end of the fifth capacitor C5 is connected to the input negative electrode of the filter circuit, a first end of the second inductor L2 is connected to the first end of the fifth capacitor C5, a second end of the second inductor L2 is connected to a first end of the third inductor L3, and a second end of the third inductor L3 is connected to an output positive electrode of the filter circuit.

A first end of the sixth capacitor C6 is connected to the second end of the second inductor L2, and a second end of the sixth capacitor C6 is connected to an output negative electrode of the filter circuit.

As shown in FIG. 8, in other words, the second end of the third inductor L3 is connected to an end A, and the second end of the fifth capacitor C5 and the second end of the sixth capacitor C6 are both connected to an end B.

It should be understood that L2, L3, C5, and C6 form a second-order filter circuit that can perform filtering on the alternating current power supply AC, to improve quality of the power supply.

In addition, the filter circuit in FIG. 8 above is described by using the second-order filter circuit as an example. It should be understood that the filter circuit included in the resonant AC/DC converter provided in the embodiments may also be a first-order filter circuit. Details are described below with reference to the accompanying drawings.

Figure 9:
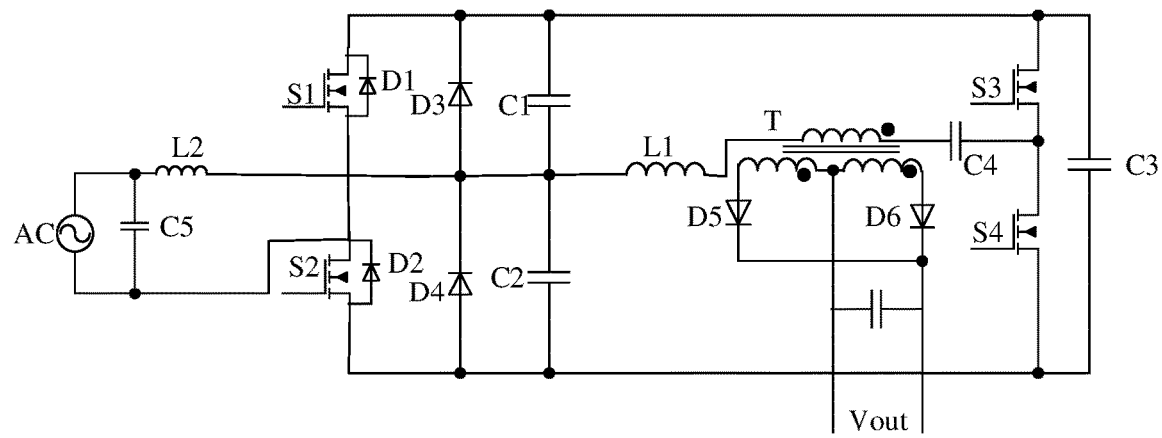
FIG. 9 is a schematic diagram of still yet another resonant AC/DC converter according to an embodiment.

FIG. 9 is a schematic diagram of still another resonant AC/DC converter according to an embodiment.

A difference between FIG. 9 and FIG. 8 is that a filter circuit may use a first-order filter circuit, that is, one capacitor (a fifth capacitor C5) and one inductor (a second inductor L2) are included.

It can be seen from FIG. 9 that a first end of the fifth capacitor C5 is connected to an input positive electrode of the filter circuit, a second end of the fifth capacitor C5 is connected to an input negative electrode of the filter circuit, a first end of the second inductor L2 is connected to the first end of the fifth capacitor C5, and a second end of the second inductor L2 is connected to an output positive electrode of the filter circuit.

Figure 10:
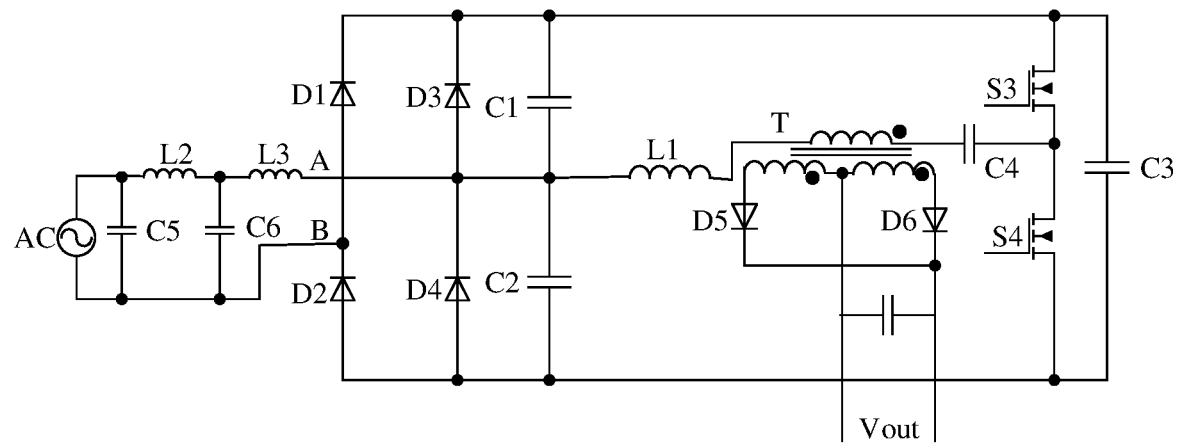
FIG. 10 is a schematic diagram of a further resonant AC/DC converter according to an embodiment.

It should be noted that, in FIG. 8 and FIG. 9, both the filter circuits are described by using an example in which the half bridge rectifier circuit includes two switching transistors. In addition, the filter circuits corresponding to FIG. 8 and FIG. 9 are also applicable to a case in which the half bridge rectifier circuit includes two diodes. FIG. 10 is a schematic diagram of a filter circuit that is corresponding to FIG. 8 and that is applicable to the half bridge rectifier circuit including two diodes. Details are not described herein again.

The foregoing embodiments describe the resonant AC/DC converter. The following describes application scenarios of the resonant AC/DC converter by using examples.

Adapter Embodiment

Based on the resonant AC/DC converter provided in the foregoing embodiments, this embodiment further provides an adapter. The adapter is described below in detail with reference to the accompanying drawing.

The adapter provided in this embodiment is a power adapter, including the resonant AC/DC converter described in the foregoing embodiments. Details are not described herein again.

The adapter can implement one-to-many charging, and features a relatively wide charging voltage range. A charging voltage may be adjusted based on an actual charging need. For example, the adapter may charge a phone watch, a mobile phone, a laptop computer, or a tablet computer. When the adapter is connected to a to-be-charged device, a charging circuit required by the to-be-charged device may be learned by using a handshake signal specified in a communications protocol, so as to adjust an output voltage of the adapter to charge the to-be-charged device.

Figure 11:
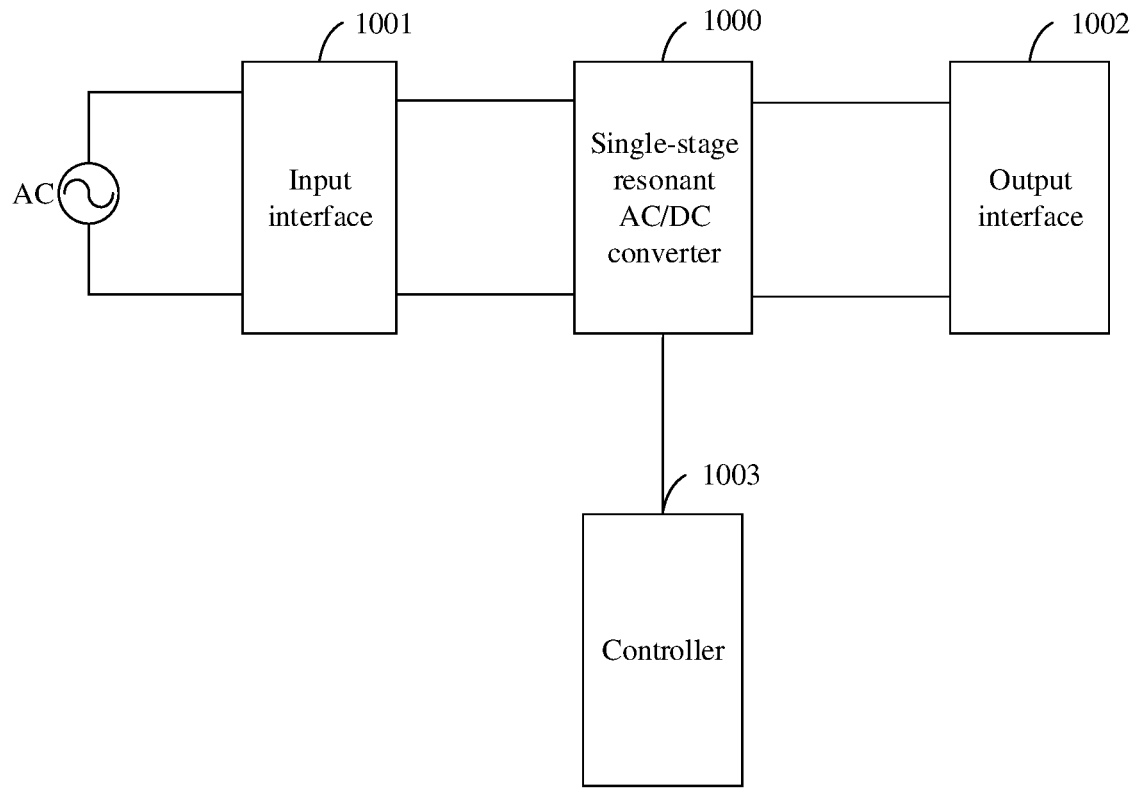
FIG. 11 is a schematic diagram of an adapter according to an embodiment.

FIG. 11 is a schematic diagram of an adapter according to an embodiment.

In addition to the resonant AC/DC converter 1000 described in the foregoing converter embodiments, the adapter provided in this embodiment further includes: an input interface 1001, an output interface 1002, and a controller 1003.

The input interface 1001 is configured to connect to an alternating current power supply AC.

The controller 1003 is configured to control the resonant AC/DC converter 1000 to perform conversion on the alternating current power supply AC, and provide a converted voltage to the output interface 1002.

The output interface 1002 is configured to charge a to-be-charged device.

The adapter provided in this embodiment includes the resonant AC/DC converter. A power conversion circuit provided in this embodiment is implemented by the resonant DC/DC conversion circuit, the resonant DC/DC conversion circuit integrates a function of a PFC circuit and a function of a DC/DC conversion circuit, and the resonant DC/DC conversion circuit includes a transformer. Therefore, signal isolation can be implemented, and there is no need to dispose an isolating circuit. The resonant DC/DC conversion circuit can implement both power factor correction and direct current conversion. Therefore, the resonant DC/DC conversion circuit integrates functions of two stages of conventional power conversion circuits. Compared with the two stages of conventional power conversion circuits, circuit density is increased, a circuit architecture is simplified, and a quantity of power electronic devices is reduced, thereby facilitating miniaturization of the resonant DC/DC conversion circuit and overall miniaturization of a power adapter.

A specific application scenario of the adapter is not limited in this embodiment, and the adapter may be applied to any mobile end that needs to be charged. The output voltage of the adapter may range from 0 V to 60 V and is adjustable. For example, the adapter is a wired power adapter of an intelligent end such as a mobile phone, a wired power adapter of a tablet computer, or a wired power adapter of a notebook computer.

Electronic Device Embodiment

Figure 12:
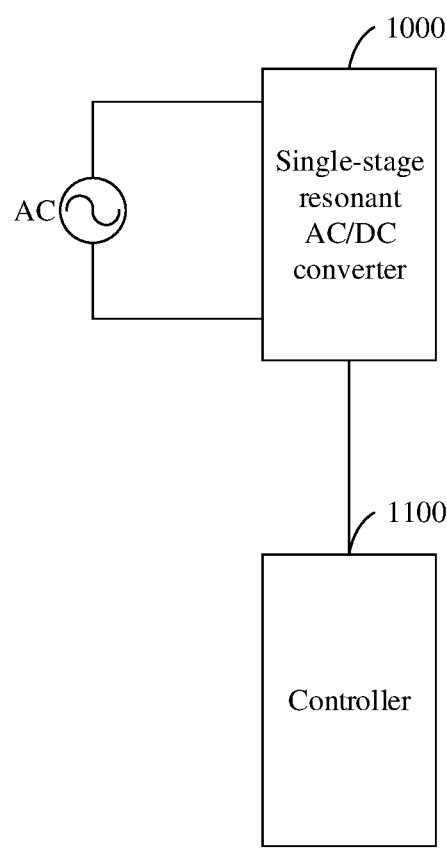
FIG. 12 is a schematic diagram of an electronic device according to an embodiment.

FIG. 12 is a schematic diagram of an electronic device according to an embodiment.

The electronic device provided in this embodiment includes the resonant AC/DC converter 1000 described in the foregoing converter embodiments, and further includes a controller 1100.

The controller 1100 is configured to control the resonant AC/DC converter 1000 to perform conversion on an alternating current power supply AC before power is supplied to a load.

A form of the load is not limited in this embodiment. For example, the load may be a battery or a next-stage power-consuming circuit.

The electronic device includes the resonant AC/DC converter, the resonant AC/DC converter combines two stages of power conversion circuits into one, that is, includes only one stage of conversion circuit, and the one stage of conversion circuit implements both AC/DC and DC/DC. Therefore, the converter can use a relatively small quantity of power electronic devices. Therefore, an overall volume of the electronic device can be reduced, thereby facilitating miniaturization of the electronic device, and reducing an overall weight of the electronic device. In this way, the electronic device is convenient to carry.

It should be understood that, in the embodiments, "at least one (item)" means one or more, and "a plurality of" means two or more. The term "and/or" is used to describe an association relationship between associated objects, and indicates that three relationships may exist. For example, "A and/or B" may indicate the following three cases: only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The foregoing embodiments are merely intended to describe solutions, but are not limiting. Although described in detail with reference to the foregoing embodiments, persons of ordinary skill in the art should understand that they may still make modifications to the solutions described in the foregoing embodiments or make equivalent replacements to some features thereof, without departing from the spirit and scope of the solutions of the embodiments.

What is claimed is:

1. A resonant AC/DC converter, comprising:
   a half bridge rectifier circuit, a clamping surge protection circuit, and a resonant DC/DC conversion circuit, wherein
   an input end of the half bridge rectifier circuit is configured to be connected to an alternating current power supply to convert an alternating current of the alternating current power supply into a pulsating direct current;
   the clamping surge protection circuit is connected to the half bridge rectifier circuit in parallel, and the clamping surge protection circuit is connected to a resonant capacitor in the resonant DC/DC conversion circuit in parallel; the resonant capacitor is connected to a bus capacitor in parallel; and the clamping surge protection circuit comprises at least a unilateral conduction component;
   the clamping surge protection circuit is configured to clamp a voltage of the alternating current power supply when the voltage of the alternating current power supply is greater than a voltage of the bus capacitor, so that energy of the alternating current power supply is released to the bus capacitor; and clamp a voltage of the resonant capacitor in the resonant DC/DC conversion circuit when the voltage of the alternating current power supply is less than or equal to the voltage of the bus capacitor; and
   the resonant DC/DC conversion circuit is configured to perform electric energy conversion on the pulsating direct current that is output by the half bridge rectifier circuit, and then perform output.

2. The resonant AC/DC converter according to claim 1, wherein the half bridge rectifier circuit comprises a first diode and a second diode; and
   a positive electrode of the first diode is connected to a negative electrode of the second diode, the negative electrode of the second diode is connected to a negative electrode of the alternating current power supply, a negative electrode of the first diode is connected to a positive electrode of a bus, and a positive electrode of the second diode is connected to a negative electrode of the bus.

3. The resonant AC/DC converter according to claim 1, wherein the half bridge rectifier circuit comprises a first switching transistor and a second switching transistor; and
   a first end of the first switching transistor is connected to a positive electrode of a bus, a second end of the first switching transistor is connected to a first end of the second switching transistor, and a second end of the second switching transistor is connected to a negative electrode of the bus; and the first end of the second switching transistor is connected to a negative electrode of the alternating current power supply.

4. The resonant AC/DC converter according to claim 3, wherein an anti-parallel diode is disposed on each of the first switching transistor and the second switching transistor.

5. The resonant AC/DC converter according to claim 2, wherein the unilateral conduction component comprises a third diode and a fourth diode;

a positive electrode of the third diode is connected to a positive electrode of the alternating current power supply, and a negative electrode of the third diode is connected to the positive electrode of the bus; and
a negative electrode of the fourth diode is connected to the positive electrode of the alternating current power supply, and a positive electrode of the fourth diode is connected to the negative electrode of the bus.

6. The resonant AC/DC converter according to claim 5, wherein the resonant DC/DC conversion circuit comprises a first resonant capacitor, a second resonant capacitor, a first resonant inductor, and a transformer;
a first end of the first resonant capacitor is connected to the positive electrode of the bus, a second end of the first resonant capacitor is connected to the positive electrode of the alternating current power supply, a first end of the second resonant capacitor is connected to the second end of the first resonant capacitor, and a second end of the second resonant capacitor is connected to the negative electrode of the bus; and
a first end of the first resonant inductor is connected to the second end of the first resonant capacitor, and a second end of the first resonant inductor is connected to a primary-side winding of the transformer.

7. The resonant AC/DC converter according to claim 6, wherein the resonant DC/DC conversion circuit further comprises a third switching transistor, a fourth switching transistor, a direct current blocking capacitor, and a secondary-side rectifier circuit;
the secondary-side rectifier circuit is connected to a secondary-side winding of the transformer; and
a first end of the third switching transistor is connected to the positive electrode of the bus, and a second end of the third switching transistor is connected to the primary-side winding of the transformer by using the direct current blocking capacitor; and the second end of the third switching transistor is connected to a first end of the fourth switching transistor, and a second end of the fourth switching transistor is connected to the negative electrode of the bus.

8. The resonant AC/DC converter according to claim 7, wherein the secondary-side rectifier circuit comprises one of:
a full-wave rectifier circuit, a full bridge rectifier circuit, or a half bridge rectifier circuit.

9. The resonant AC/DC converter according to claim 8, further comprising a filter circuit, wherein:
an input positive electrode of the filter circuit is connected to the positive electrode of the alternating current power supply, an input negative electrode of the filter circuit is connected to the negative electrode of the alternating current power supply, an output positive electrode of the filter circuit is connected to the clamping surge protection circuit, and an output negative electrode of the filter circuit is connected to the half bridge rectifier circuit.

10. The resonant AC/DC converter according to claim 9, wherein the filter circuit comprises a fifth capacitor, a sixth capacitor, a second inductor, and a third inductor;
a first end of the fifth capacitor is connected to the positive electrode of the alternating current power supply, a second end of the fifth capacitor is connected to the negative electrode of the alternating current power supply, a first end of the second inductor is connected to the first end of the fifth capacitor, a second end of the second inductor is connected to a first end of the third inductor, and a second end of the third inductor is connected to the clamping surge protection circuit; and
a first end of the sixth capacitor is connected to the second end of the second inductor, and a second end of the sixth capacitor is connected to the half bridge rectifier circuit.

11. An electronic device, comprising:
a resonant AC/DC converter, and a controller, the controller is configured to control the resonant AC/DC converter to perform conversion on an alternating current power supply before power is supplied to a load, and the AC/DC converter comprises a half bridge rectifier circuit, a clamping surge protection circuit, and a resonant DC/DC conversion circuit, wherein:
an input end of the half bridge rectifier circuit is configured to be connected to the alternating current power supply to convert an alternating current of the alternating current power supply into a pulsating direct current;
the clamping surge protection circuit is connected to the half bridge rectifier circuit in parallel, and the clamping surge protection circuit is connected to a resonant capacitor in the resonant DC/DC conversion circuit in parallel; the resonant capacitor is connected to a bus capacitor in parallel; and the clamping surge protection circuit comprises at least a unilateral conduction component;
the clamping surge protection circuit is configured to clamp a voltage of the alternating current power supply when the voltage of the alternating current power supply is greater than a voltage of the bus capacitor, so that energy of the alternating current power supply is released to the bus capacitor; and clamp a voltage of the resonant capacitor in the resonant DC/DC conversion circuit when the voltage of the alternating current power supply is less than or equal to the voltage of the bus capacitor; and
the resonant DC/DC conversion circuit is configured to perform electric energy conversion on the pulsating direct current that is output by the half bridge rectifier circuit, and then perform output to the load.

12. An adapter, comprising:
an input interface, an output interface, a controller, and a resonant AC/DC converter, the input interface is configured to connect to an alternating current power supply, the output interface is configured to charge a to-be-charged device, the controller is configured to control the resonant AC/DC converter to perform conversion on the alternating current power supply, and provide a converted voltage to the output interface, and the AC/DC converter comprises a half bridge rectifier circuit, a clamping surge protection circuit, and a resonant DC/DC conversion circuit, wherein:
an input end of the half bridge rectifier circuit is configured to be connected to the input interface to convert the alternating current of the alternating current power supply into a pulsating direct current;
the clamping surge protection circuit is connected to the half bridge rectifier circuit in parallel, and the clamping surge protection circuit is connected to a resonant capacitor in the resonant DC/DC conversion circuit in parallel; the resonant capacitor is connected to a bus capacitor in parallel; and the clamping surge protection circuit comprises at least a unilateral conduction component;
the clamping surge protection circuit is configured to clamp a voltage of the alternating current power supply when the voltage of the alternating current power supply is greater than a voltage of the bus capacitor, so that energy of the alternating current power supply is released to the bus capacitor; and clamp a voltage of the resonant capacitor in the resonant DC/DC conversion circuit when the voltage of the alternating current power supply is less than or equal to the voltage of the bus capacitor; and the resonant DC/DC conversion circuit is configured to perform electric energy conversion on the pulsating direct current that is output by the half bridge rectifier circuit, and then perform output to the output interface.

13. The adapter according to claim 12, wherein the half bridge rectifier circuit comprises a first diode and a second diode; and a positive electrode of the first diode is connected to a negative electrode of the second diode, the negative electrode of the second diode is connected to a negative electrode of the alternating current power supply, a negative electrode of the first diode is connected to a positive electrode of a bus, and a positive electrode of the second diode is connected to a negative electrode of the bus.

14. The adapter according to claim 12, wherein the half bridge rectifier circuit comprises a first switching transistor and a second switching transistor; and a first end of the first switching transistor is connected to a positive electrode of a bus, a second end of the first switching transistor is connected to a first end of the second switching transistor, and a second end of the second switching transistor is connected to a negative electrode of the bus; and the first end of the second switching transistor is connected to a negative electrode of the alternating current power supply.

15. The adapter according to claim 14, wherein an anti-parallel diode is disposed on each of the first switching transistor and the second switching transistor.

16. The adapter according to claim 13, wherein the unilateral conduction component comprises a third diode and a fourth diode;

a positive electrode of the third diode is connected to a positive electrode of the alternating current power supply, and a negative electrode of the third diode is connected to the positive electrode of the bus; and a negative electrode of the fourth diode is connected to the positive electrode of the alternating current power supply, and a positive electrode of the fourth diode is connected to the negative electrode of the bus.

17. The adapter according to claim 16, wherein the resonant DC/DC conversion circuit comprises a first resonant capacitor, a second resonant capacitor, a first resonant inductor, and a transformer;

a first end of the first resonant capacitor is connected to the positive electrode of the bus, a second end of the first resonant capacitor is connected to the positive electrode of the alternating current power supply, a first end of the second resonant capacitor is connected to the second end of the first resonant capacitor, and a second end of the second resonant capacitor is connected to the negative electrode of the bus; and a first end of the first resonant inductor is connected to the second end of the first resonant capacitor, and a second end of the first resonant inductor is connected to a primary-side winding of the transformer.

18. The adapter according to claim 17, wherein the resonant DC/DC conversion circuit further comprises a third switching transistor, a fourth switching transistor, a direct current blocking capacitor, and a secondary-side rectifier circuit;

the secondary-side rectifier circuit is connected to a secondary-side winding of the transformer; and a first end of the third switching transistor is connected to the positive electrode of the bus, and a second end of the third switching transistor is connected to the primary-side winding of the transformer by using the direct current blocking capacitor; and the second end of the third switching transistor is connected to a first end of the fourth switching transistor, and a second end of the fourth switching transistor is connected to the negative electrode of the bus.

19. The adapter according to claim 18, wherein the secondary-side rectifier circuit comprises one of:

a full-wave rectifier circuit, a full bridge rectifier circuit, or a half bridge rectifier circuit.

20. The adapter according to claim 19, further comprising a filter circuit, wherein:

an input positive electrode of the filter circuit is connected to the positive electrode of the alternating current power supply, an input negative electrode of the filter circuit is connected to the negative electrode of the alternating current power supply, an output positive electrode of the filter circuit is connected to the clamping surge protection circuit, and an output negative electrode of the filter circuit is connected to the half bridge rectifier circuit.

* * * * *